(12) United States Patent
Zhao et al.

(10) Patent No.: US 10,137,732 B2
(45) Date of Patent: Nov. 27, 2018

(54) UNIVERSAL WHEEL ASSEMBLY AND SUITCASE

(71) Applicant: Xiaomi Inc., Beijing (CN)

(72) Inventors: Tong Zhao, Beijing (CN); Qun Tao, Beijing (CN); Huayijun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/188,284

(22) Filed: Jun. 21, 2016

(65) Prior Publication Data

US 2017/0021668 A1 Jan. 26, 2017

(30) Foreign Application Priority Data

Jul. 21, 2015 (CN) .......................... 2015 1 0432151

(51) Int. Cl.
*A45C 5/14* (2006.01)
*B60B 33/08* (2006.01)

(52) U.S. Cl.
CPC ............ *B60B 33/08* (2013.01); *A45C 5/14* (2013.01); *A45C 2005/142* (2013.01); *B60B 2200/45* (2013.01); *B60B 2380/12* (2013.01); *B60B 2900/212* (2013.01); *B60B 2900/321* (2013.01); *B60B 2900/325* (2013.01)

(58) Field of Classification Search
CPC ................................. A45C 5/14; B60B 33/08
USPC ............................................ 190/18 A; 16/24
See application file for complete search history.

(56) References Cited

U.S. PATENT DOCUMENTS

| 843,153 | A | * | 2/1907 | Kuhsiek | .................. B60B 33/08 16/24 |
| 2,605,989 | A | * | 8/1952 | Luft | .......................... A45C 5/14 190/18 A |
| 3,127,190 | A | | 3/1964 | Thesmar | |
| 3,381,330 | A | * | 5/1968 | Aninger | .................. B60B 33/08 16/21 |

(Continued)

FOREIGN PATENT DOCUMENTS

| CN | 2067658 U | 12/1990 |
| CN | 2121360 U | 11/1992 |

(Continued)

OTHER PUBLICATIONS

Notification of Reason for Refusal dated Sep. 19, 2017, in Korean Application No. 10-2016-7013584.

(Continued)

*Primary Examiner* — Sue A Weaver
(74) *Attorney, Agent, or Firm* — Finnegan, Henderson, Farabow, Garrett & Dunner LLP

(57) ABSTRACT

The present disclosure relates to a universal wheel assembly and a suitcase including the universal wheel assembly. The universal wheel assembly includes: a base structure including an upper base and a lower base which form a cavity therebetween; and a wheel bail locked in the cavity in a manner such that the wheel ball is capable of rolling in all directions, wherein a bottom of the lower base is provided with an opening enabling a part of the wheel bail to protrude out of a lower end face of the lower base to form an exposed rolling spherical surface, and an inner diameter of the opening is smaller than a diameter of the wheel ball.

12 Claims, 15 Drawing Sheets

(56) References Cited

U.S. PATENT DOCUMENTS

| | | | | |
|---|---|---|---|---|
| 3,797,067 A | * | 3/1974 | Rodgers | B60B 33/08 16/223 |
| 3,880,481 A | * | 4/1975 | George | B66F 9/0751 384/513 |
| 4,383,563 A | * | 5/1983 | Kirchhoff, Jr. | A63B 55/00 190/18 A |
| 4,402,108 A | | 9/1983 | Pannwitz | |
| 4,996,738 A | | 3/1991 | Tifre | |
| 5,068,943 A | * | 12/1991 | Estkowski | B60B 33/0028 16/18 A |
| 7,578,028 B2 | * | 8/2009 | Sellars | B60B 33/08 16/20 |
| 8,553,908 B2 | * | 10/2013 | Sugihara | H03F 1/0233 330/51 |
| 2006/0101614 A1 | | 5/2006 | Sellars | |

FOREIGN PATENT DOCUMENTS

| | | |
|---|---|---|
| CN | 2176922 Y | 9/1994 |
| CN | 87213317 | 8/1998 |
| CN | 2505311 Y | 8/2002 |
| CN | 104972833 | 10/2015 |
| CN | 204801421 U | 11/2015 |
| DE | 3117666 | 11/1982 |
| EP | 2476562 A1 | 7/2012 |
| GB | 2515508 | 12/2014 |
| JP | 34-17437 | 10/1959 |
| JP | 48-49011 U | 10/1971 |
| JP | 47-2195 | 1/1972 |
| JP | 48-94133 | 12/1973 |
| JP | 49-147213 | 4/1974 |
| JP | H11-180105 A | 7/1999 |
| KR | 10-2001-0096875 A | 11/2001 |
| KR | 1020040076178 | 8/2004 |
| LU | 36883 A | 2/1959 |

OTHER PUBLICATIONS

Notification of Reasons for Refusal dated Aug. 8, 2017, in Japanese Application No. 2016-534670.
International Search Report dated Apr. 27, 2016, which was received in international application No. PCT/CN2015/098941 (2 pages).
Supplementary European Search Report dated Dec. 21, 2016, which was received in European application No. 16161911.9 (7 pages).
Notification of the First Office Action dated Sep. 5, 2016, which was received in Chinese application No. 201510432151.9 (6 pages).
English translation of Russian Office Action dated Mar. 6, 2018, in counter part Russian Patent Application No. 2016116188/12(025382).

* cited by examiner

UNIVERSAL WHEEL ASSEMBLY AND SUITCASE

CROSS-REFERENCE TO RELATED APPLICATIONS

The present application is based upon and claims priority to Chinese Patent Application number 201510432151.9, filed on Jul. 21, 2015, the entire contents of which are incorporated herein by reference.

TECHNICAL FIELD

The present disclosure generally relates to the technical field of wheel assemblies, and more particularly, to a universal wheel assembly and a suitcase having the universal wheel assembly.

BACKGROUND

Wheel assemblies are installed on bottoms of cabinets, cases and the like which are easy to be moved and carried in everyday life. For example, people usually carry suitcases on business trips or personal travels. In some suitcases, the bottoms are installed with two or four wheel assemblies so that the suitcases can be dragged by the users.

However, wheel assemblies of a suitcase are prone to be damaged, sometimes rendering the whole suitcase useless.

SUMMARY

According to a first aspect of embodiments of the present disclosure, there is provided a universal wheel assembly, including: a base structure including an upper base and a lower base which form a cavity therebetween; and a wheel ball locked in the cavity in a manner such that the wheel ball is capable of rolling in all directions, wherein a bottom of the lower base is provided with an opening enabling a part of the wheel ball to protrude out of a lower end face of the lower base to form an exposed rolling spherical surface, and an inner diameter of the opening is smaller than a diameter of the wheel ball.

According to a second aspect of embodiments of the present disclosure, there is provided a suitcase, including: a case body; and at least one universal wheel assembly, wherein the at least one universal wheel assembly includes: a base structure including an upper base and a lower base which form a cavity therebetween; and a wheel ball locked in the cavity in a manner such that the wheel ball is capable of rolling in all directions, wherein a bottom of the lower base is provided with an opening enabling a part of the wheel ball to protrude out of a lower end face of the lower base to form an exposed rolling spherical surface, and an inner diameter of the opening is smaller than a diameter of the wheel ball.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
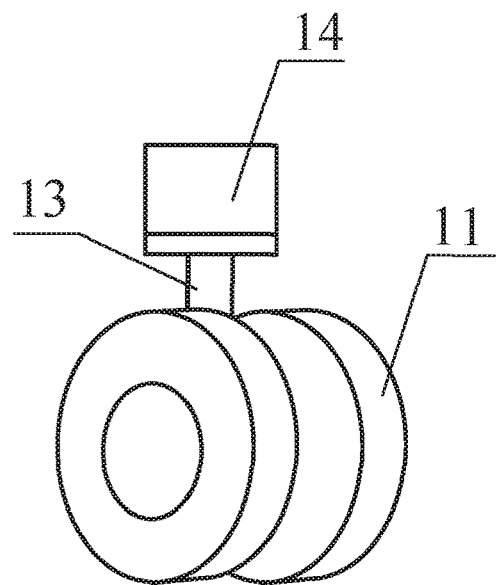
FIG. 1A and FIG. 1B are diagrams showing a universal wheel assembly in the related art.
Figure 1B:
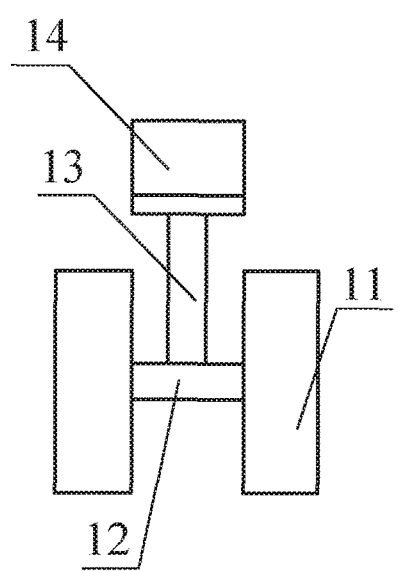

FIG. 1A and FIG. 1B are diagrams showing a universal wheel assembly in the related art. As shown in FIG. 1A and FIG. 1B, the universal wheel assembly in the related art includes two rolling wheels 11, which are arranged in parallel. The two rolling wheels 11 are connected by a horizontal shaft 12, thus enabling the two rolling wheels 11 to roll synchronously around the horizontal shaft 12, and enabling a suitcase having the universal wheel assembly to move along the ground. The horizontal shaft 12 is further connected with a vertical shaft 13, which is connected to a bearing structure 14 at a bottom of a suitcase (or other objects which are not shown in the figures) so that the two rolling wheels 11, the horizontal shaft 12, and the vertical shaft 13 can rotate integrally in a horizontal direction around the bearing structure 14, so that the suitcase can rotate "universally".

However, as a rolling structure in direct contact with the ground, the rolling wheels 11 are completely exposed. Thus, the rolling wheels 11, the horizontal shaft 12, or the vertical shaft 13 are prone to be damaged or broken. For example, when moved on a rough ground or violently handled in transportation, the universal rolling wheels are often the most breakable structures of a suitcase or a cabinet.

The present disclosure improves the structure of the universal wheel assembly so as to solve the existing problems in the related art. Detailed description will be provided below with reference to the accompanying drawings.

1. Integral Structure

Figure 2:
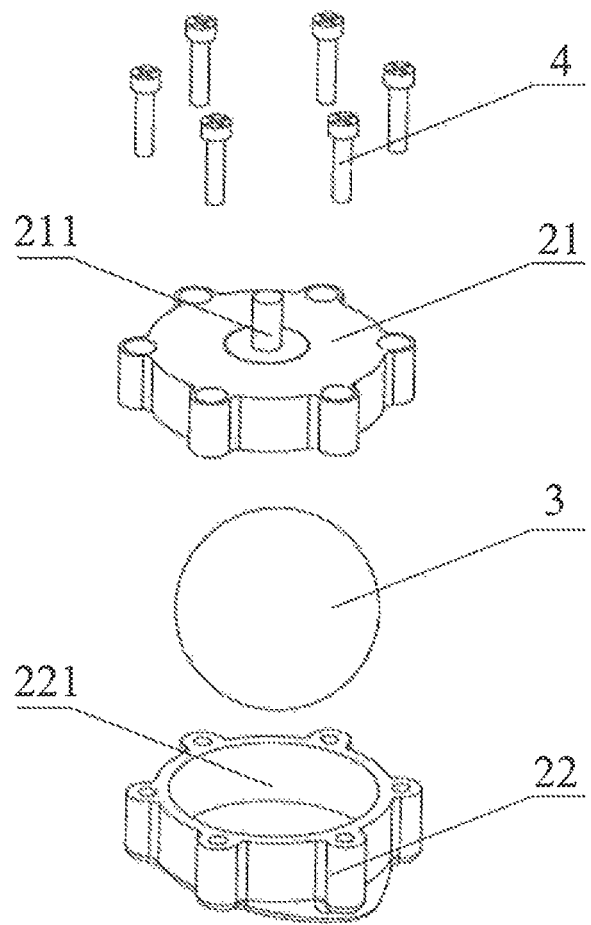
FIG. 2 is an exploded view of a universal wheel assembly, according to an exemplary embodiment.
Figure 3:
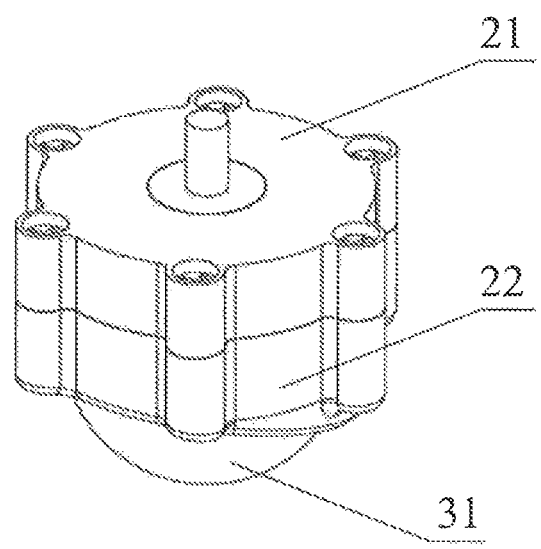
FIG. 3 is a perspective view of an assembled universal wheel assembly, according to an exemplary embodiment.

FIG. 2 is an exploded view of a universal wheel assembly, according to an exemplary embodiment. FIG. 3 is a perspective view of an assembled universal wheel assembly, according to an exemplary embodiment. As shown in FIG. 2 and FIG. 3, the universal wheel assembly includes a base structure including an upper base 21 and a lower base 22, which form a cavity 221 therebetween. The universal wheel assembly also includes a wheel ball 3 locked in the cavity 221 in a manner such that the wheel ball 3 is capable of rolling in all directions. A bottom of the lower base 22 is provided with an opening that enables a part of the wheel ball 3 to protrude out of a lower end face of the lower base 22 so as to form an exposed rolling spherical surface 31. An inner diameter of the opening is smaller than a diameter of the wheel ball 3.

In exemplary embodiments, the wheel ball 3 may be received within the cavity 221 formed in the base structure and be enclosed by the base structure. This structure avoids direct contact between the wheel hall 3 and the outside, thereby preventing damage to the wheel ball 3 due to a rough ground, violent handling during transportation, and so on. In addition, because the wheel ball 3 is enclosed by the base structure, the universal wheel assembly does not need fragile and easily-broken structures, such as the horizontal shaft 12, the vertical shaft 13, and the like as shown in FIG. 1B, to enable rolling of the universal wheel assembly. Thus, damage to the base structure and the wheel ball 3 caused by rough ground and violent handling during transportation can be prevented, thereby improving the overall reliability of the universal wheel assembly.

In exemplary embodiments, the inner diameter of the opening formed on the lower end face of the lower base 22 is smaller than the diameter of the wheel ball 3. Thus it is necessary to place the wheel ball 3 in the cavity 221 when the upper base 21 and the lower base 22 are separated, and then connect the upper base 21 and the lower base 22 together to obtain the complete universal wheel assembly. In one exemplary embodiment, the upper base 21 and the lower base 22 may be connected by a screw fastener. For example, as shown in FIG. 2, screws 4 penetrate through threaded holes respectively arranged on peripheries of the upper base 21 and the lower base 22 to connect the upper base 21 and the lower base 22.

Figure 4:
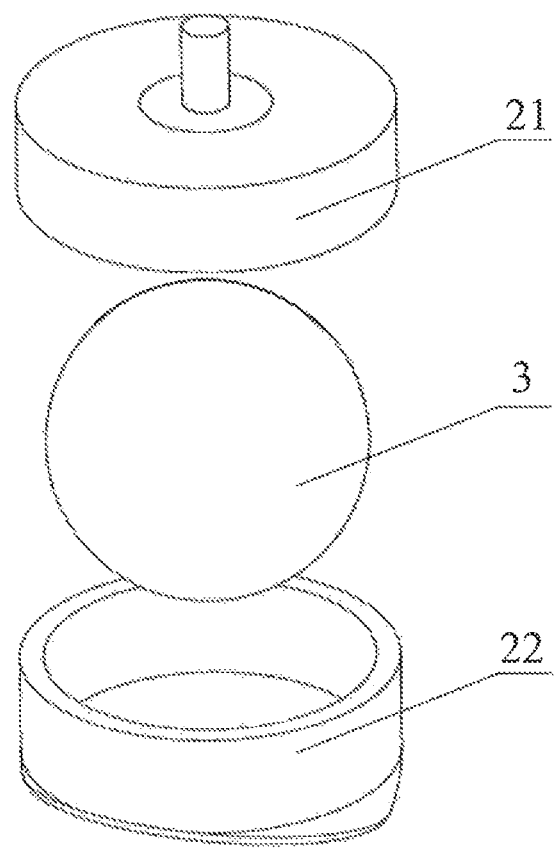
FIG. 4 is an exploded view of another universal wheel assembly, according to an exemplary embodiment.

As another exemplary embodiment, the upper base 21 and the lower base 22 may be connected by adhesion. As shown in FIG. 4, an adhesive, such as glue or the like, is coated on at least one of a lower end face of the upper base 21 and an upper end face of the lower base 22 to adhere the upper base 21 with the lower base 22. The present disclosure does not limit the methods for connecting the upper base 21 and the lower base 22. Various other methods may be used.

2. Roller Structure

Figure 5:
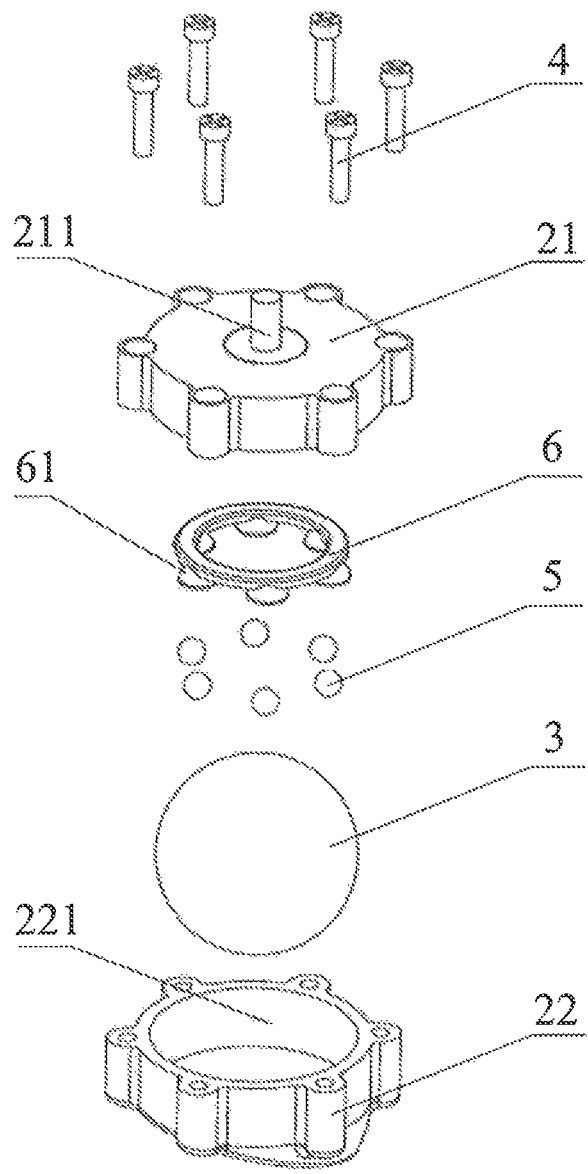
FIG. 5 is an exploded view of another universal wheel assembly, according to an exemplary embodiment.

FIG. 5 is an exploded view of another universal wheel assembly, according to an exemplary embodiment. As shown in FIG. 5, in addition to the structure shown in FIG. 2, the universal wheel assembly may further include at least three rollers 5 rollably arranged between an inner wall of the upper base 21 and a surface of the wheel ball 3.

In exemplary embodiments, the rollers 5 are arranged so as to convert sliding friction between the wheel ball 3 and a bottom surface or the inner wall of the upper base 21 into rolling friction between the wheel ball 3 and the rollers 5, thereby reducing a friction force experienced by the wheel ball 3 during a rolling process. Thus, the universal wheel assembly moves more smoothly.

Further, as shown in FIG. 5, an elastic gasket 6 may be arranged between the inner wall of the upper base 21 and the surface of the wheel ball 3. The elastic gasket 6 includes at least three roller mounting bases 61 uniformly distributed on a bottom of the elastic gasket 6 along a circumferential direction in one-to-one correspondence with the at least three rollers 5. The roller mounting bases 61 include recessed portions matching the shapes of the rollers 5.

In exemplary embodiments, the elastic gasket 6 may be arranged to absorb vibration that occurs during a rolling process of the rollers 5 and the wheel ball 3, thereby implementing a damping effect, and prolonging the service life of the universal wheel assembly. In addition, an elastic force of the elastic gasket 6 may press the rollers 5 with a suitable force to keep the rollers 5 and the wheel ball 3 in constant contact without affecting normal rolling between the rollers 5 and the wheel ball 3 (i.e., a pressing force is not too large), thereby ensuring the stability of the integral structure of the universal wheel assembly.

Figure 6:
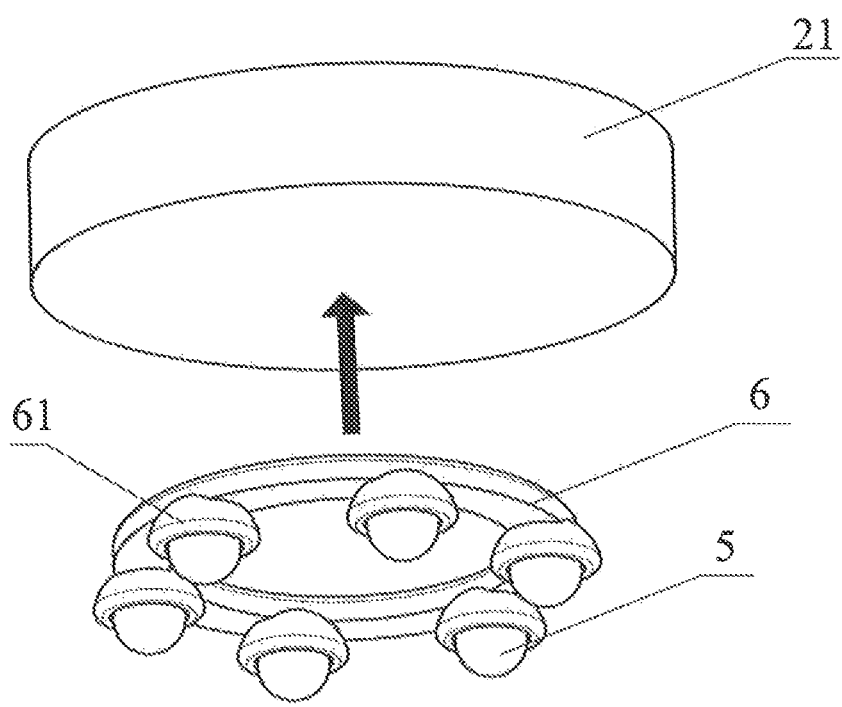
FIG. 6 is a schematic diagram showing a structure and an assembly relation between an elastic gasket and an upper base, according to an exemplary embodiment.

In exemplary embodiments, the roller mounting bases 61 are in a bowl shape having a downward opening, as shown in FIG. 6. The bowl shape structure accommodates at least one part of each of the rollers 5 therein, and constrains the positions of the rollers 5, thereby preventing separation of rollers 5 from the roller mounting bases 61.

In the disclosed embodiments, there may be various matching relations between the elastic gasket 6 and the upper base 21. Two possible matching relations are described below, but the matching relations are not limited by these two examples.

Matching Relation 1

In an exemplary embodiment of the present disclosure, as shown in FIG. 6, the upper base 21 includes a disc-shaped circular ring structure and the elastic gasket 6 is arranged on the lower end face of the upper base 21. In this embodiment, the whole cavity 221 as shown in FIG. 2 is located within the lower base 22, and the upper base 21 serves as a cover of the cavity 221.

Matching Relation 2

Figure 7:
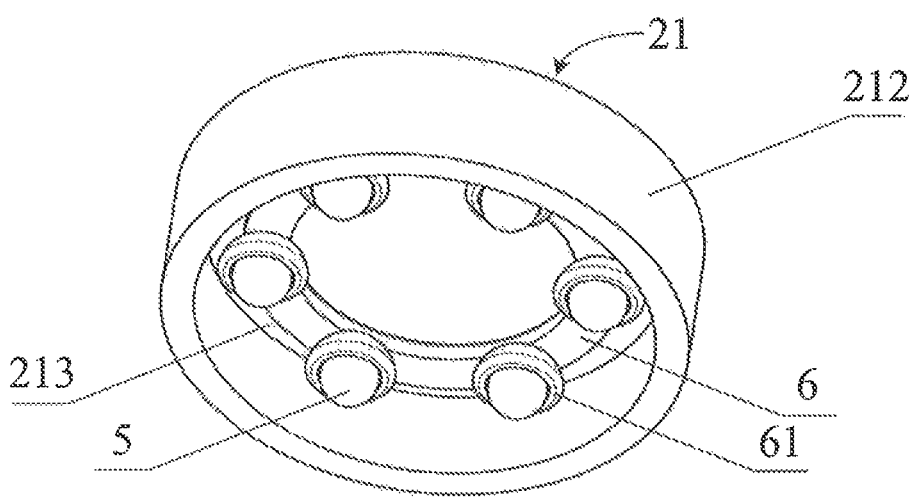
FIG. 7 is a schematic diagram showing another structure and assembly relation between an elastic gasket and an upper base, according to an exemplary embodiment.

In another exemplary embodiment of the present disclosure, as shown in FIG. 7, the upper base 21 includes a cylinder 212 and an upper end cover 213 located on an upper end face of the cylinder 212. The elastic gasket 6 is arranged on a lower end face of the upper end cover 213 and located inside the cylinder 212. In this embodiment, the cavity 221 shown in FIG. 2 is jointly formed by the upper base 21 and the lower base 22, so the upper base 21 and the lower base 22 have a smaller structural difference than the embodiment shown in FIG. 6. The upper base 21 and the lower base 22 may even have symmetrical structures, so as to facilitate production and machining. For example, the upper base 21 and the lower base 22 may use completely identical structures, or at least some machining processes of the upper base 21 and the lower base 22 may overlap, thereby reducing the production cost and improving the production efficiency.

Figure 8:
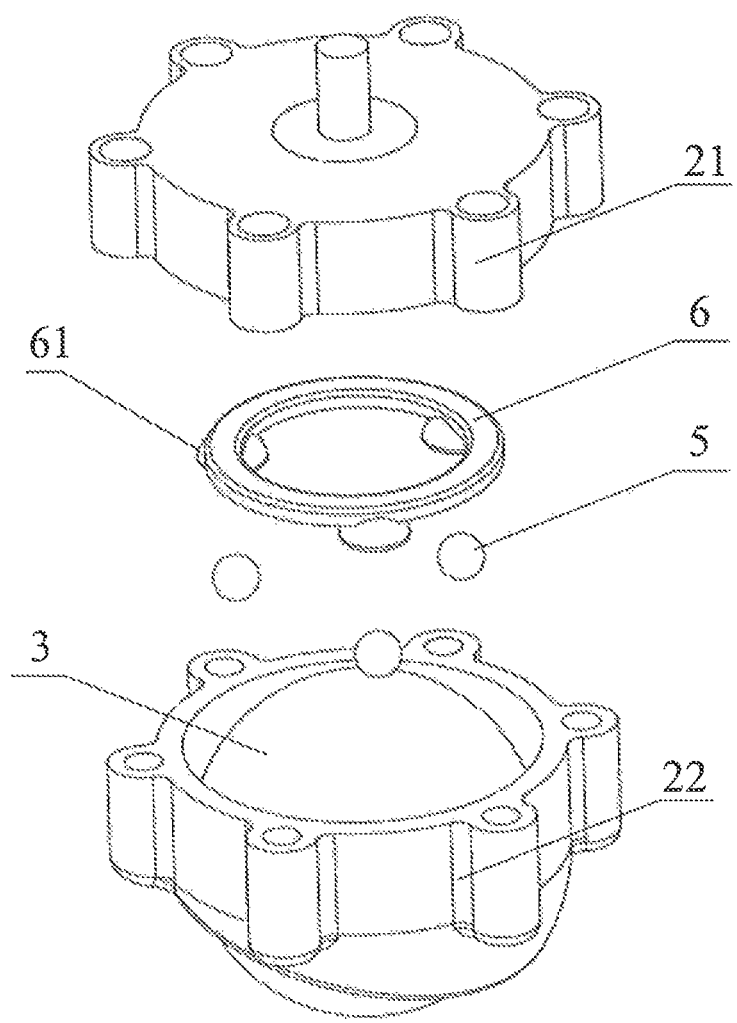
FIG. 8 is an exploded view of another universal wheel assembly, according to an exemplary embodiment.
Figure 9:
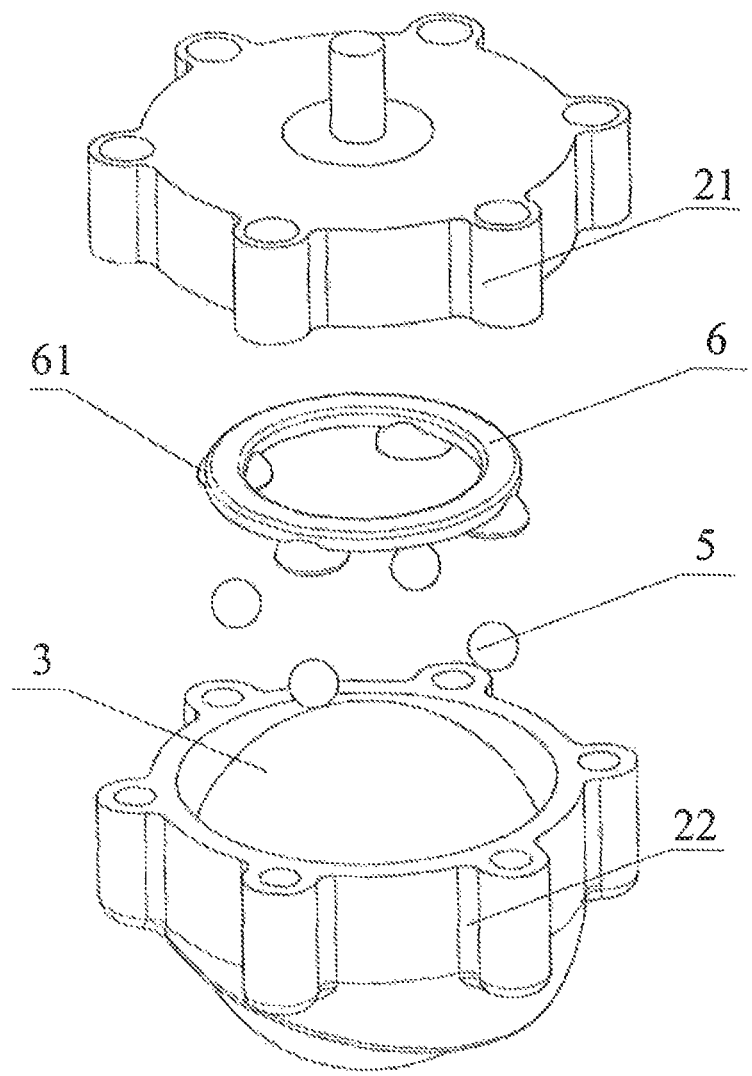
FIG. 9 is an exploded view of another universal wheel assembly, according to an exemplary embodiment.
Figure 10:
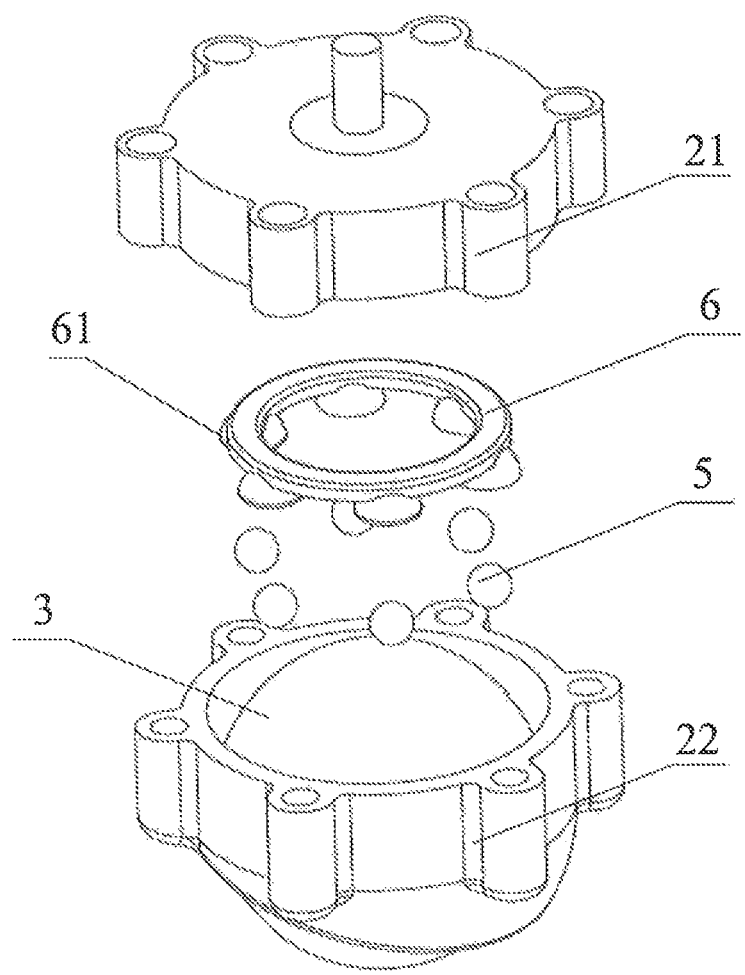
FIG. 10 is an exploded view of another universal wheel assembly, according to an exemplary embodiment.

In addition, although six rollers 5 are shown in FIG. 5, because a straight line is determined by three points, the disclosed embodiments can ensure the stability of the rollers 5 and the wheel ball 3 during a rolling process by arranging not less than (i.e., at least) three rollers. In other words, the disclosed embodiments do not limit the number of rollers 5 used in the universal wheel assembly, as long as not less than three rollers 5 are used. For example, FIG. 8, FIG. 9, and FIG. 10 respectively illustrate three, four and five rollers 5 used in the universal wheel assembly.

3. Arrangement of End Face of Lower Base 22

Figure 11:
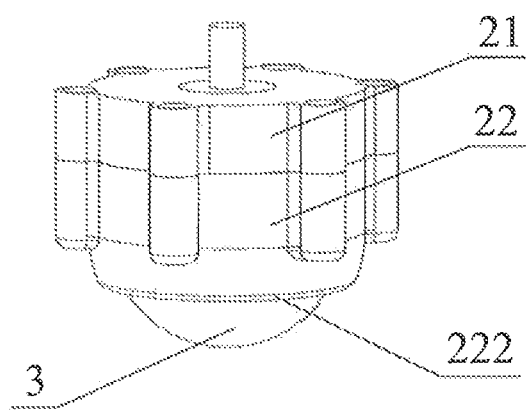
FIG. 11 is a perspective view of a structure of another assembled universal wheel assembly, according to an exemplary embodiment.

In an exemplary embodiment, as shown in FIG. 11, the lower end face 222 of the lower base 22 may be parallel with a horizontal plane. In this embodiment, the lower end face 222 can protect the wheel ball 3 uniformly in all angles, thereby avoiding an impact on the wheel ball 3, and improving the reliability of the universal wheel assembly.

Figure 12:
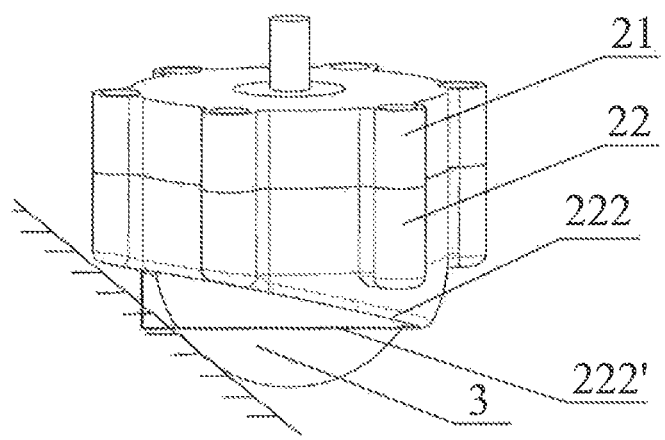
FIG. 12 is a perspective view of a structure of another assembled universal wheel assembly, according to an exemplary embodiment.

In another exemplary embodiment, as shown in FIG. 12, the lower end face 222 of the lower base 22 may be an oblique plane inclined with respect to a horizontal plane. In this embodiment, the lower end face 222 is configured as an oblique plane, which can enclose the wheel ball 3 as much as possible While ensuring that the lower end face 222 does not contact a sloped surface (e.g., the sloped ground as shown in FIG. 12) even when a user uses the suitcase or cabinet on a slope of a large angle, e.g., when the user drags a suitcase up and down a slope. The oblique configuration of the lower end face 222 can avoid inconvenient dragging and easy abrasion of the lower base 22, which are otherwise encountered when a lower end face 222' arranged in a horizontal configuration contacts the sloped surface. The oblique configuration may prolong the service life of the universal wheel assembly.

Figure 13:
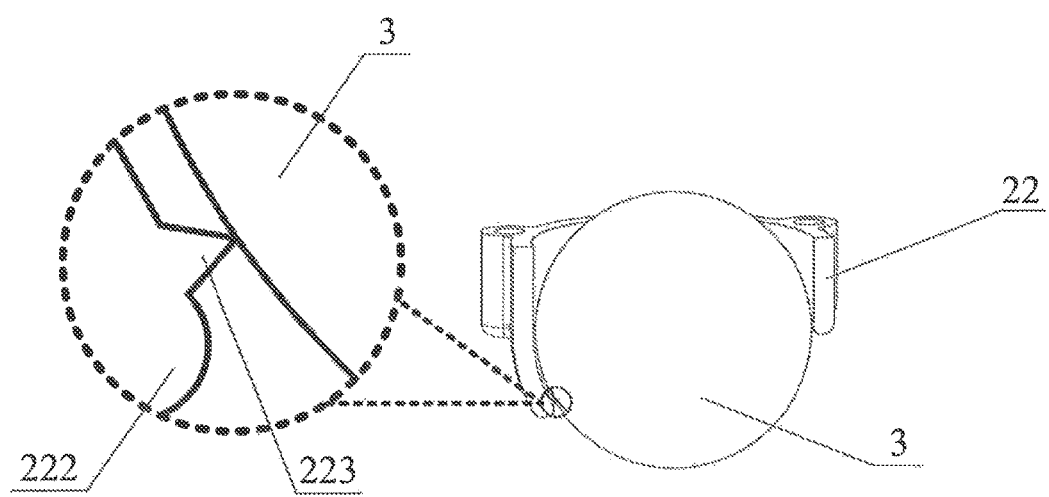
FIG. 13 is a sectional view of a universal wheel assembly, according to an exemplary embodiment.

Further, as shown in FIG. 13, an edge of an inner side of the bottom of the lower base 222 may be provided with a scraper 223. Debris adhering to the surface of the wheel ball 3 can be scrapped by the scraper 223, thereby keeping the surface of the wheel ball 3 clean, and preventing the debris from being rolled into the cavity 221. This ensures smooth rolling of the wheel ball 3. Although in FIG. 13, the structure shown in FIG. 12 is used as an example to illustrate the scraper 223, the scraper 223 can be included in the embodiments shown in FIG. 11 and other figures.

4. Suitcase

Figure 14:
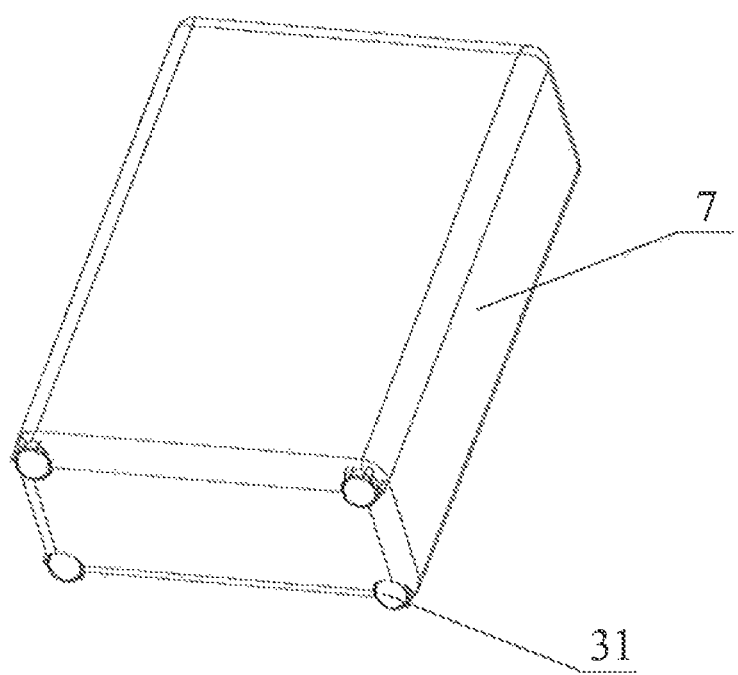
FIG. 14 is a perspective view of a structure of a suitcase, according to an exemplary embodiment.
Figure 15:
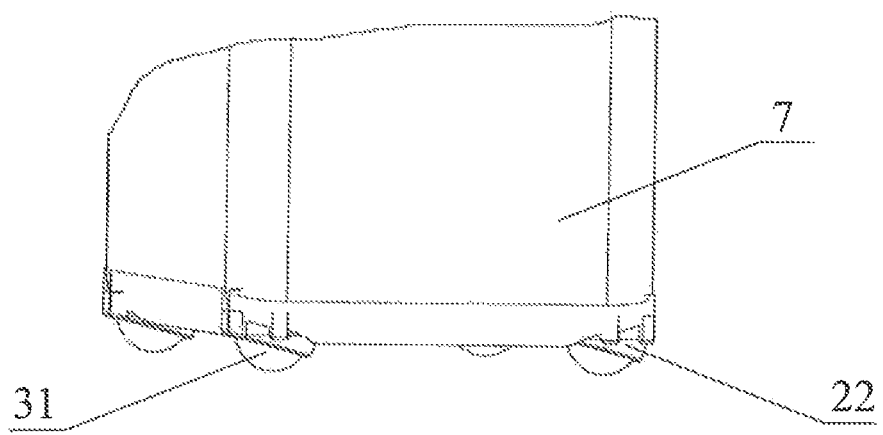
FIG. 15 is a perspective view of a partial structure of another suitcase, according to an exemplary embodiment.

FIG. 14 and FIG. 15 show suitcases installed with one or more universal wheel assemblies, according to exemplary embodiments. In the embodiments shown in FIGS. 14 and 15, four (or any other quantity) universal wheel assemblies are arranged at a bottom of a case body 7. As illustrated in FIG. 2 to FIG. 5, a top surface of the upper base 21 may be provided with a connector 211, such that a universal base and the case body 7 can be connected. Other connection methods may be also applied.

As shown in FIG. 14, at least one part of a base structure of each universal wheel assembly may be embedded inside a bottom plate of the case body 7, while an exposed rolling spherical surface 31 of the wheel ball 3 of the universal wheel assembly may be located outside of the bottom of the case body 7, thereby ensuring that the rolling spherical surface 31 contacts the ground and rolls on the ground. In the embodiment shown in FIG. 15, a major portion of the base structure may be enclosed inside the case body 7, while only the rolling spherical surface 31 and the corresponding portions of the lower base 22 are exposed. This configuration protects the wheel ball 3 and the base structure, and avoids direct contact with an external force during violent handling in transportation and so on, thereby prolonging the service life of the universal wheel assembly.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A suitcase, comprising:
   a case body; and
   at least one universal wheel assembly, wherein the at least one universal wheel assembly comprises:
     a base structure comprising an upper base and a lower base which form a cavity therebetween;
     a wheel ball locked in the cavity in a manner such that the wheel ball is capable of rolling in all directions, wherein a bottom of the lower base is provided with an opening enabling a part of the wheel ball to protrude out of a lower end face of the lower base to form an exposed rolling spherical surface, and an inner diameter of the opening is smaller than a diameter of the wheel ball;
     at least three rollers rollably arranged between an inner wall of the upper base and a surface of the wheel ball; and
     an elastic gasket arranged between the inner wall of the upper base and the surface of the wheel ball, wherein the elastic gasket includes roller mounting bases uniformly distributed on a bottom of the elastic gasket in a circumferential direction in one-to-one correspondence with the at least three rollers, and wherein the roller mounting bases include recessed portions matching shapes of the at least three rollers;
     wherein the elastic gasket is arranged to absorb vibration that occurs during a rolling process of the rollers and the wheel ball, and press the rollers with a suitable force to keep the rollers and the wheel ball in constant contact without affecting normal rolling between the rollers and the wheel ball.

2. The suitcase according to claim 1, wherein the upper base and the lower base are connected by adhesion.

3. The suitcase according to claim 1, wherein the upper base and the lower base are connected by a screw fastener.

4. The suitcase according to claim 1, wherein the lower end face of the lower base is parallel with a horizontal plane; or
   the lower end face of the lower base is an oblique plane inclined with respect to the horizontal plane.

5. The suitcase according to claim 1, wherein an edge of an inner side of the bottom of the lower base is provided with a scraper.

6. The suitcase according to claim 1, wherein at least one part of the base structure of the universal wheel assembly is embedded inside a bottom plate of the case body, and the exposed rolling spherical surface of the wheel ball of the universal wheel assembly is located outside of a bottom of the case body.

7. A universal wheel assembly, comprising:
   a base structure comprising an upper base and a lower base which form a cavity therebetween;

a wheel ball locked in the cavity in a manner such that the wheel ball is capable of rolling in all directions, wherein a bottom of the lower base is provided with an opening enabling a part of the wheel ball to protrude out of a lower end face of the lower base to form an exposed rolling spherical surface, and an inner diameter of the opening is smaller than a diameter of the wheel ball;

at least three rollers rollably arranged between an inner wall of the upper base and a surface of the wheel ball; and an elastic gasket arranged between the inner wall of the upper base and the surface of the wheel ball, wherein the elastic gasket includes roller mounting bases uniformly distributed on a bottom of the elastic gasket in a circumferential direction in one-to-one correspondence with the at least three rollers, and wherein the roller mounting bases include recessed portions matching shapes of the at least three rollers;

wherein the elastic gasket is arranged to absorb vibration that occurs during a rolling process of the rollers and the wheel ball, and press the rollers with a suitable force to keep the rollers and the wheel ball in constant contact without affecting normal rolling between the rollers and the wheel ball.

8. The universal wheel assembly according to claim 1, wherein the upper base and the lower base are connected by adhesion.

9. The universal wheel assembly according to claim 1, wherein the upper base and the lower base are connected by a screw fastener.

10. The universal wheel assembly according to claim 1, wherein the lower end face of the lower base is parallel with a horizontal plane.

11. The universal wheel assembly according to claim 1, wherein the lower end face of the lower base is an oblique plane inclined with respect to a horizontal plane.

12. The universal wheel assembly according to claim 1, wherein an edge of an inner side of the bottom of the lower base is provided with a scraper.

\* \* \* \* \*